US012434441B2

(12) United States Patent
Obst et al.

(10) Patent No.: US 12,434,441 B2
(45) Date of Patent: Oct. 7, 2025

(54) METHOD FOR ADDITIVE MANUFACTURING OF A THREE-DIMENSIONAL OBJECT

(71) Applicant: Bayerische Motoren Werke Aktiengesellschaft, Munich (DE)

(72) Inventors: Philip Obst, Munich (DE); Paul Victor Osswald, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 18/261,423

(22) PCT Filed: Dec. 2, 2021

(86) PCT No.: PCT/EP2021/083904
§ 371 (c)(1),
(2) Date: Jul. 13, 2023

(87) PCT Pub. No.: WO2022/152459
PCT Pub. Date: Jul. 21, 2022

(65) Prior Publication Data
US 2024/0059021 A1   Feb. 22, 2024

(30) Foreign Application Priority Data
Jan. 14, 2021   (DE) ..................... 10 2021 100 620.1

(51) Int. Cl.
*B29C 64/124* (2017.01)
*B29C 64/165* (2017.01)
(Continued)

(52) U.S. Cl.
CPC .......... *B29C 64/393* (2017.08); *B29C 64/165* (2017.08); *B29C 64/264* (2017.08);
(Continued)

(58) Field of Classification Search
None
See application file for complete search history.

(56) References Cited

U.S. PATENT DOCUMENTS

2003/0198824 A1   10/2003  Fong et al.
2016/0369096 A1 *  12/2016  Rolland ................ C08G 18/42
(Continued)

FOREIGN PATENT DOCUMENTS

DE   10 2018 215 002 A1    3/2020
WO   WO-2018183440 A1 * 10/2018 ............. B33Y 70/10
(Continued)

OTHER PUBLICATIONS

PCT/EP2021/083904, International Search Report dated Mar. 23, 2022 (Four (4) pages).
(Continued)

*Primary Examiner* — Yung-Sheng M Tsui
(74) *Attorney, Agent, or Firm* — Crowell & Moring LLP (57) ABSTRACT

A method for additive manufacturing of a three-dimensional object includes successively exposing a construction material having at least one UV-curable component by UV radiation to form a green body and subjecting the green body to thermal energy, where at least one component of the construction material thermally cures to form the three-dimensional object upon exceeding of a curing temperature. The successively exposing by the UV radiation to form the green body is controlled such that at least in sections the curing temperature of the at least one component is not significantly exceeded.

14 Claims, 2 Drawing Sheets

(51) Int. Cl.
 *B29C 64/264* (2017.01)
 *B29C 64/393* (2017.01)
 *B33Y 10/00* (2015.01)
 *B33Y 50/02* (2015.01)
 B29L 31/30 (2006.01)
 B33Y 80/00 (2015.01)

(52) U.S. Cl.
 CPC ............... *B33Y 10/00* (2014.12); *B33Y 50/02* (2014.12); *B29L 2031/30* (2013.01); *B33Y 80/00* (2014.12)

(56) References Cited

U.S. PATENT DOCUMENTS

| | | |
|---|---|---|
| 2017/0113416 A1 | 4/2017 | DeSimone et al. |
| 2018/0264718 A1 | 9/2018 | McCluskey |

FOREIGN PATENT DOCUMENTS

| | | |
|---|---|---|
| WO | WO 2019/165052 A1 | 8/2019 |
| WO | WO 2020/117490 A1 | 6/2020 |

OTHER PUBLICATIONS

German Search Report issued in German application No. 10 2021 100 620.1 dated Jul. 9, 2021, with Statement of Relevancy (Seven (7) pages).

* cited by examiner

Fig. 1

METHOD FOR ADDITIVE MANUFACTURING OF A THREE-DIMENSIONAL OBJECT

BACKGROUND AND SUMMARY OF THE INVENTION

The invention relates to a method for additive manufacturing of a three-dimensional object, wherein a green body is formed by a successive, in particular layer-by-layer, selective exposure and solidification of a construction material comprising at least one UV-curable component by means of UV radiation. This green body can be subjected to thermal energy in a following method step, in order to thus form the three-dimensional object.

Corresponding methods are fundamentally known from the prior art. For example, the additive manufacturing method designated as digital light synthesis (DLS) technology or also as the CLIP method (continuous liquid interface production) is based on the above-described fundamental principle.

The DLS or CLIP method has the disadvantage that in the course of the introduction of energy into the construction material by means of the UV radiation, a high level of heating of at least one component of the construction material can occur, which can result in viscosity properties of the construction material and possibly partial curing of the construction material.

The invention is based on the object of specifying a method which, in particular with regard to a simple and rapid and also cost-effective measure, increases the quality of the three-dimensional objects to be manufactured and/or enables precise predefined mechanical properties of the three-dimensional objects to be manufactured.

The invention relates to a method for additive manufacturing of a three-dimensional object by way of the following method steps: (a)—first solidification step—successive, in particular layer-by-layer, selective exposure and solidification of a construction material comprising at least one UV-curable component by means of UV radiation to form a green body, (b)—second solidification step—subjecting the green body to thermal energy, wherein at least one component of the construction material thermally cures when a curing temperature is exceeded to form the three-dimensional object, wherein (c) the exposure of the green body by means of the UV radiation—during the first method step—is controlled in such a way that the curing temperature of the at least one component is not significantly exceeded, at least in some sections.

The additive manufacturing method can use, for example, a construction material comprising a resin-based material or a resin material, in particular an artificial resin material. For example, a DLS method or a CLIP method is used as the additive manufacturing method. The DLS method is distinguished in particular in that a liquid and UV-curable construction material located in a construction container is selectively cured by means of UV radiation in order to form a green body having a defined shape. This green body or preform is subsequently subjected to a thermal curing process in a second process step—solidification step—and subjected to thermal energy. For this purpose, the green body can be put into a furnace or a heating chamber.

At least one first component of the construction material triggers a predominantly, in particular completely strength-increasing reaction due to UV radiation incident on the construction material. The construction material can comprise at least two components, for example, wherein at least one component thermally cures when a curing temperature is exceeded or executes a reaction initiated by the thermal energy, which results in solidification or a change of the cross-linking or interlinking of the construction material. Higher and/or more targeted mechanical properties for the three-dimensional object can be achieved by a construction material which includes at least two components, which have different curing behaviors, by deliberate utilization of the respective curing behavior of the components. Because the construction material reacts to both UV radiation and thermal energy or induces respective reactions (in particular independent of one another), two different networks of chains, for example polymer chains, can form in the manufacturing method. Above-average mechanical properties can be achieved by tying the two different networks or the polymer chains with one another.

The control of the exposure carried out by means of the UV radiation in the first method step forming the green body takes place in such a way that at least in sections the curing temperature of the at least one component, in particular all components, of the construction material is not exceeded or is not significantly exceeded. In other words, during the production of the green body by inducing the UV-assisted solidifying reaction of at least one component of the construction material, the at least one further, at least thermally curing component of the construction material cannot yet experience curing or solidification, in particular cannot yet experience significant or predominant curing or solidification in the actual meaning. The curing or solidification capability of the construction material due to application of thermal energy is therefore to be reserved as much as possible, in particular completely, for the second process step, in which the green body is subjected to thermal energy in a targeted manner.

Not significantly exceeding the curing temperature means that the curing temperature can be exceeded at points or briefly in the course of the UV application, but this introduction of thermal energy is so slight that it does not result in significant curing or solidification of the thermally curing component of the construction material. In other words, not significantly exceeding the curing temperature can comprise exceeding the curing temperature, in particular briefly, by at most 15%, preferably at most 10%, particularly preferably at most 5%. Alternatively or additionally, a curing temperature which is not significantly exceeded can comprise a temperature or introduction of energy due to a possibly exceeded curing temperature which enables a residual solidification capability or residual curing capability of the construction material already cured by means of UV radiation, in particular at least the thermally curing component of the construction material cured by means of UV radiation, due to the action of thermal energy of at least 70%, preferably at least 85%, particularly preferably at least 95%. The curing temperature can also be understood as the thermal limiting energy introduction of the thermal energy, upon the exceeding of which cross-linking or curing of the thermally curing component of the construction material takes place.

The control of the exposure carried out by means of the UV radiation to form the green body can take place, for example, in such a way that at least 50%, preferably at least 75%, particularly preferably at least 85%, most preferably at least 95% of at least one construction material layer of the green body to be exposed does not experience significant exceeding of the curing temperature or the respective percentage specifications of the construction material layers forming the green body still has a thermal cross-linking potential or curing capability for the following process step of applying thermal energy to the green body. The percentage specifications can alternatively or additionally relate to the volume of the green body, i.e., for example, that considered in relation to the overall volume of the green body, at least 50%, preferably at least 75%, particularly preferably at least 85%, most preferably at least 95% of the volume of the green body still has a significant thermal cross-linking potential or curing capability after the first method step directing the UV radiation on the construction material.

The exposure carried out by means of the UV radiation to form the green body can be controlled, for example, in such a way that thermal curing due to significantly exceeding the curing temperature of the at least one component of the construction material results at most in a 20 vol. %, preferably at most 12.5 vol. %, particularly preferably at most 7.5 vol. %, most preferably at most 2.5 vol. % thermal curing of the green body in the course of the action of the UV radiation.

The method of the invention described herein preferably relates to a computer-assisted method. At least the control of the UV radiation during the first solidification step is executed with the aid of a computer. The computer-assisted method preferably comprises the control of further elements of the additive manufacturing device via a central computer unit, for example by means of the computing device. Thus, for example, filling fresh non-solidified construction material into the construction container (for example volume flow) and/or moving the construction plate relative to the construction container and/or the UV radiation and/or a temperature control device of the construction chamber can be described in respective control parameter data and respective actuators can be activated in accordance with the control parameter data.

It is possible that the successive, in particular layer-by-layer, selective exposure and solidification of the construction material comprising at least one, in particular predominantly UV-curable component by means of UV radiation to form the green body takes place in a construction chamber, wherein there is a detection device in and/or on the construction chamber for detecting parameter data and/or a temperature value and the control of the exposure carried out by means of the UV radiation to form the green body takes place as a function of the parameter data and/or as a function of the temperature value. For example, the detection device is designed as a thermal camera, so that during the first process step, the thermal effect on the surface of the construction material can be detected or monitored by means of the thermal camera. If exceeding of a reference temperature or a curing temperature or imminent exceeding of the curing temperature is detected in this case, it is possible to react by changing the control of the UV radiation. In particular, the occurrence of exceeding can be averted and/or the briefest possible exceeding of the curing temperature can be enabled by corresponding control of the exposure carried out by means of the UV radiation. The detection device can also alternatively or additionally detect or monitor the effect of a temperature control device of the additive manufacturing device.

Alternatively or additionally, the detection device can detect a viscosity value of the construction material in a contactless or contacting manner. A viscosity value of the construction material can provide a conclusion about the degree of the curing or cross-linking, which has taken place due to introducing thermal energy or exceeding a curing temperature, of at least one component of the construction material during the UV radiation introduction taking place in the first solidification step and can therefore be used as an input variable for influencing the control of the exposure comprising the UV radiation.

In one advantageous embodiment, it can prove to be expedient if the control of the exposure carried out by means of the UV radiation to form the green body takes place (a) as a function of parameter data and/or temperature values obtained from preceding additive manufacturing methods for manufacturing at least one three-dimensional object and/or (b) as a function of parameter data and/or temperature values derived in the course of a simulation in consideration of a target geometry of the three-dimensional object to be manufactured. Initially, for example, historic data on preceding additively manufactured three-dimensional objects can be used, in particular to obtain, upon a comparison of the geometry of the preceding three-dimensional objects and the upcoming three-dimensional object to be manufactured, data relating to the thermal energy introduction during the application of the UV radiation to the construction material. These data can be used to control the UV radiation to achieve the least possible thermal energy introduction or at least the limiting of the thermal energy introduction below a curing temperature. Alternatively or additionally to data obtained in real preceding manufacturing processes, obtaining or generating on the basis of a simulation items of information useful for the control of the UV radiation can be used to control the UV radiation during the manufacturing of the preform. These items of information can be used in such a way that a curing temperature is not significantly exceeded during the first solidification step.

It is possible that to ascertain data obtained from preceding additive manufacturing methods, at least one three-dimensional object manufactured from the preceding manufacturing method is subjected to a strength and/or rigidity analysis. The data, in particular the data indicating exceeding of the curing temperature during the first solidification step, can be ascertained in this case, for example, proceeding from strength and/or rigidity values of the preceding manufactured three-dimensional object ascertained from the strength and/or rigidity analysis. A conclusion about the degree of the thermal curing of the at least one component of the construction material during the exposure based on UV radiation in the first solidification step can be produced on the basis of the data ascertained in the strength and/or rigidity analysis.

The control of the exposure by means of the UV radiation to form the green body can be controlled, for example, in such a way that the average temperature in the construction material forming the green body is at most 55° C., preferably at most 45° C., particularly preferably at most 37.5° C., most preferably at most 25° C. If the average or maximum temperature does not exceed the limiting values 55° C., preferably 45° C., particularly preferably 37.5° C., most preferably 25° C., cross-linking or curing of the at least one component of the construction material due to the effect of thermal energy or due to exceeding the curing temperature can be prevented.

The control of the exposure by means of the UV radiation to form the green body can comprise, for example, at least one of the following process parameters: (a) a change of a waiting time of a first UV introduction to a second UV introduction by means of the UV radiation within one or different construction material layers and/or (b) a change of an intensity of a UV introduction of the UV radiation into the construction material within a construction material layer and/or (c) a change of a duration of an exposure time of a UV energy introduction of the UV radiation within a construction material layer and/or (d) a change of a wavelength of a UV energy introduction of the UV radiation within one or more construction material layers. The listed process parameters are capable of keeping the introduction of thermal energy into the construction material during the exposure by means of the UV radiation to form the green body slight and/or harmless for thermal curing or cross-linking of the at least one component of the construction material.

The control of the exposure by means of UV radiation to form the green body can take place, for example, as a function of at least one item of target geometry information of the three-dimensional object to be manufactured and/or as a function of an item of setpoint geometry information of the green body. The at least one item of target and/or setpoint geometry information can provide, for example, a conclusion about the thermal energy introduction per unit of area into the construction material taking place during the UV radiation introduction. It can be expedient, for example, that the target geometry information of the three-dimensional object to be manufactured and/or the setpoint geometry information of the green body are compared to data stored in a database. These (comparison) data can relate to items of information respectively associated with geometrically similar or identical previously manufactured three-dimensional objects and/or with geometrically similar or identical simulated three-dimensional objects on the curing temperatures occurring at least in sections during the manufacturing or their simulated manufacturing or corresponding energy introductions into the construction material. At least one item of partial control information, in particular an item of control information, can be taken or obtained from the database by way of this comparison and/or an association of items of target and/or setpoint geometry information provided for the upcoming construction job with similar or identical items of geometry information from the database, which enables acting on the control of the exposure carried out by means of the UV radiation to form the green body in such a way that at least in sections, in particular completely, the curing temperature of the at least one component is not significantly exceeded or the thermal energy introduction of the UV radiation into the construction material is kept below a thermal curing reaction temperature.

It is possible that parameter data and/or temperature values, which are (a) detected by a detection device and/or (b) obtained from preceding additive manufacturing methods and/or (c) derived in the course of a simulation in consideration of the target geometry of the three-dimensional object to be manufactured, can be evaluated and/or processed using a computing device employing artificial intelligence (AI) technologies, in particular to be used to influence the control of the exposure of the green body and/or a later green body carried out by means of the UV radiation. Using the artificial intelligence to evaluate and/or process the basic information to control the exposure carried out by means of the UV radiation, the previously collected data stock or the existing data stock can be used in a simple and targeted manner to prevent excessively high thermal energy introduction in the course of the UV radiation in the first solidification step.

It can be expedient in this case, for example, that the computing device executes an algorithm and/or a neural network based on or using the parameter data and/or the temperature values or trains it and the computing device information resulting therefrom is used to influence the control of the exposure of the green body carried out by means of the UV radiation. A neural network can comprise, for example, machine learning and/or deep learning. In general, the parameter data and/or temperature values originating from different sources are evaluated by the AI algorithm in such a way that their informative power with respect to the temperature development or the thermal energy introduction into the construction material increases and therefore a high level of accuracy can be achieved for the control of the exposure of the green body carried out by means of UV radiation. In this case, for example, not exceeding the curing temperature or not exceeding a tolerance threshold value of a reference temperature defined as a function of the curing temperature can be achieved more reliably or a corresponding control of the UV radiation can be achieved. For example, the machine learning can comprise or use a convolutional neural network. Alternatively or additionally, it is possible that a computing device is used which contains one or more components that use artificial intelligence (AI) technologies. Because the computing device thus applies an artificial intelligence method, an estimation function or an evaluation function can be executed for estimation or evaluation, in order to optimize the control of the UV radiation based on the estimation result and/or evaluation result in such a way that a UV introduction into the construction material inducing thermal curing or cross-linking is not exceeded or is not significantly exceeded during the manufacturing of the green body. Machine learning, such as various types of filtering and/or independent component analysis and/or support vector machine (SVM) and/or data and/or image processing technologies, such as contour extraction and/or pattern recognition and/or intelligent information processing and/or reinforced learning and/or Bayesian network and/or self-organized map (SOM) and/or neural network and/or in-depth learning, can be applied as the artificial intelligence technologies.

The construction material can comprise, for example, a resin and/or artificial resin including at least two components, wherein a first component cures predominantly, in particular exclusively, by means of UV radiation and a second component cures predominantly, in particular exclusively, by means of acting thermal energy. The curing can comprise solidification and/or cross-linking of the construction material. During the first solidification step or polymerization step to form the green body by means of the UV radiation, the construction material is provided as a liquid construction material, in particular consisting of plastic, in particular consisting of artificial resin.

During the formation of the green body based on UV radiation, thus during the first solidification step, for example, at least one structural means connected to the at least one green body can also be constructed, wherein the structural means experiences a higher thermal energy introduction achieved due to the effect of the UV radiation than the green body at least in sections, in particular completely. In other words, during the first solidification step, the construction material is also solidified at least in sections and therefore a structural means is also constructed, which is in particular not part of the target object to be manufactured in the course of the additive manufacturing method. Such structural means can connect, for example, at least one green body to a construction plate and/or a first green body to a further green body. Such structural means can preferably be designed as support means and/or handling means. Structural means designed as a support means—also designated as a support structure—can comprise a function supporting the green body, for example a support against a shear force effect.

Alternatively or additionally, it is possible that at least one structural means is provided with a predetermined breaking point, wherein the structural means is separable in a simple and convenient manner from the green body and/or the construction plate and/or the three-dimensional object (i.e., after the application of thermal energy) via the predetermined breaking point. In this case, the target body or the target object can be present after a separation of the at least one support means from the green body and/or from the construction plate and/or from the three-dimensional object.

In an optional embodiment, it can be expedient that at least one structural means includes at least one first section and one second section, wherein the first section experiences a higher thermal energy introduction during the exposure by means of the UV radiation, i.e., during the first solidification step, than the second section. It can be provided in this case, for example, that the second section of the structural means experiences a higher energy introduction during the exposure by means of the UV radiation than the green body. Because different sections of the structural means experience an energy introduction, in particular a thermal energy introduction, at different levels, the behavior of the structural means can be adapted or optimized for its task as, for example, a handling and/or support means. Because the support means is not part of the actual target object, it is unimportant if it experiences a higher thermal energy introduction in comparison to the thermal energy introduction into the construction material forming the green body in the course of the UV introduction, since the later thermal solidification and the accompanying targeted ability to adjust or design the mechanical properties are not necessarily important. In other words, it is unimportant for the physical and/or chemical properties, in particular mechanical component properties, of the target object to be manufactured whether thermal curing of the support means already results during the UV radiation-based exposure of the green body.

The first section of the structural means can be connected, for example, exclusively via the second section of the structural means to the green body and/or to a first green body. For example, the structural means is formed as a support means, wherein the green body is connected by the structural means to the construction plate. For example, the first section can face toward the construction plate, in particular can directly touch the construction plate, and the second section can form an expansion of the first section and can face toward the green body, in particular touch the green body. In this case, the first section can experience a higher thermal energy introduction in comparison to the second section in the course of the exposure of the construction material carried out by means of the UV radiation to form the green body. This is advantageous in that due to the spacing of the first section experiencing the higher thermal energy introduction, the risk of heating resulting in this way and thus impairment of the target properties of the green body and/or the three-dimensional object can be reduced or prevented.

The structural means can alternatively or additionally include at least one stability section and at least one shielding section, wherein the stability section experiences a higher thermal energy introduction during the exposure by means of the UV radiation than the shielding section, wherein the shielding section is designed as an area externally enclosing the stability section at least in sections, in particular completely. In other words, the shielding section shields the stability section, for example, from the non-solidified construction material, at least as long as this partial area of the structural means is still located in a construction container accommodating the liquid construction material.

The stability section can form, for example, as a support structure a solid and/or rigid connection between at least two green bodies and/or between a green body and the construction plate. Due to the higher thermal energy introduction by the UV radiation into the stability section, it also has a higher rigidity and/or strength than the shielding section. If the structural means is used as a support structure, the support function can be produced at least predominantly, in particular essentially or completely, by the more rigid and/or stronger stability section. The shielding section can form, for example, an envelope of the stability section at least in sections, in particular completely. Because the stability section experiences a high thermal energy introduction during the exposure by means of UV radiation, thermal influencing of the non-solidified construction material enclosing the stability section can be reduced or prevented, since the shielding section can be used as a thermal insulator or at least as a means inhibiting a discharge of thermal energy from the stability section to the non-solidified construction material. Because thermal energy cannot reach the non-solidified material from the stability section to this extent, for example, the reusability of the non-solidified material can be increased or its aging can be reduced.

In addition to the method for additive manufacturing of a three-dimensional object, the invention also relates to a three-dimensional object, in particular a vehicle component, which was manufactured in a method described herein. The vehicle component can be part of a vehicle, preferably a motor vehicle, in particular a multitrack motor vehicle, or a road vehicle driven by a motor.

All advantages, details, embodiments, and/or features of the method according to the invention are transferable or are to be applied to the three-dimensional object according to the invention.

The invention is explained in more detail on the basis of exemplary embodiments in the drawings.

DETAILED DESCRIPTION OF THE DRAWINGS

Figure 1:
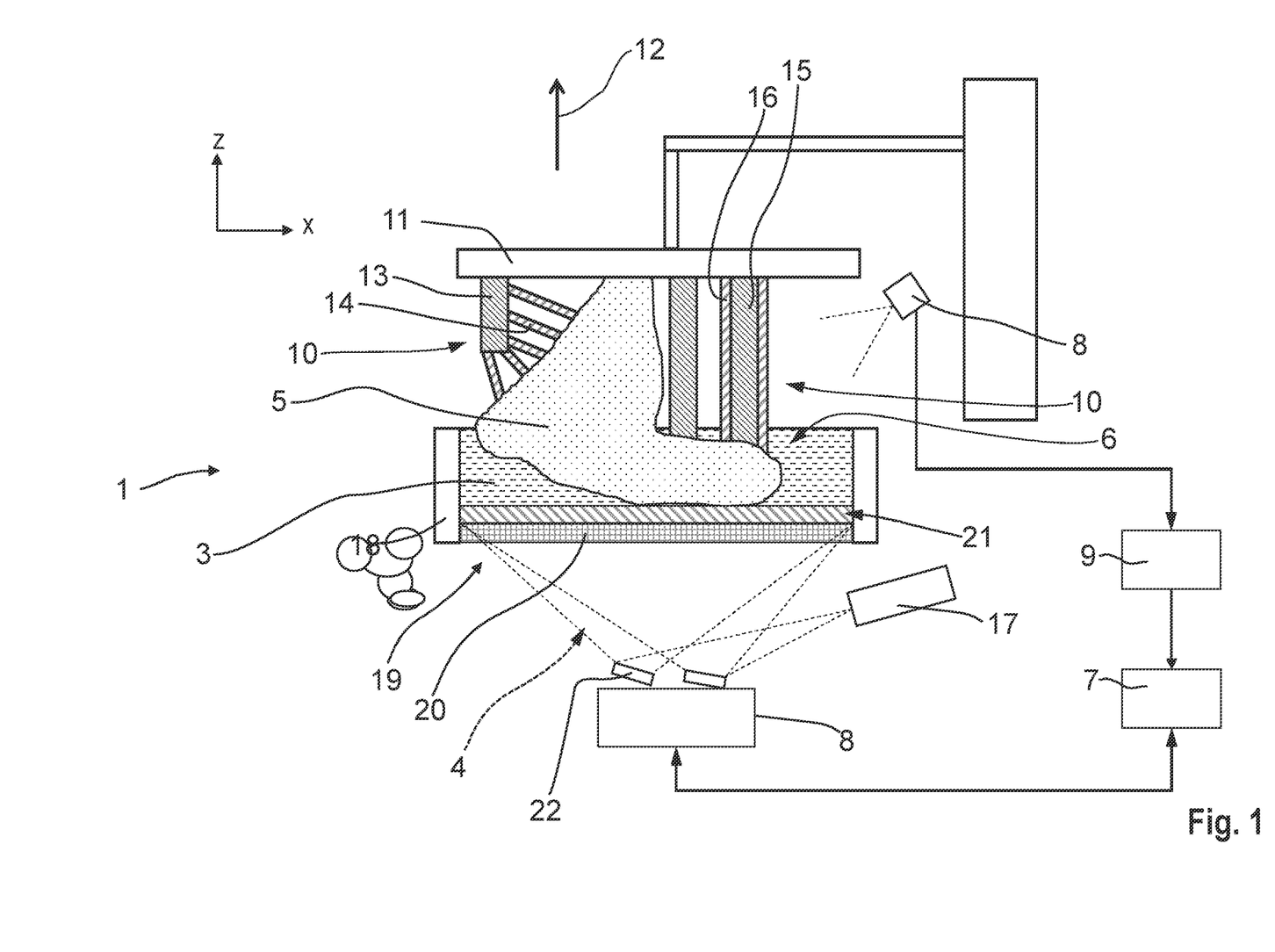
FIG. 1 shows a schematic illustration of a device for executing the method for additive manufacturing of a three-dimensional object according to an exemplary embodiment.
Figure 2:
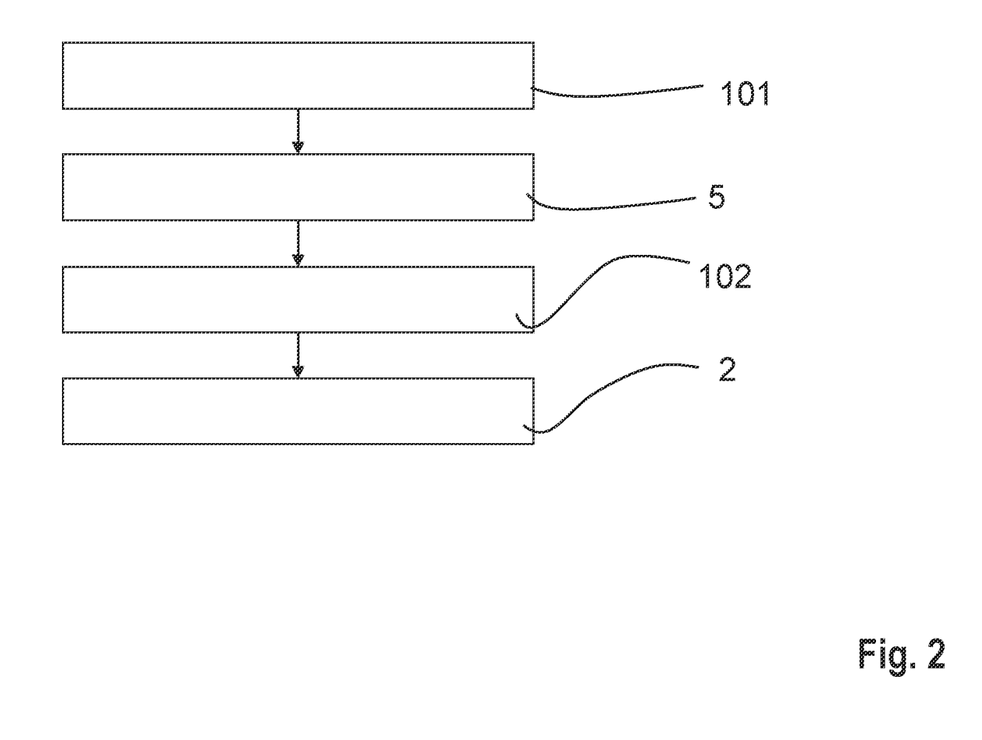
FIG. 2 shows a schematic illustration of the essential method steps of the method for additive manufacturing of a three-dimensional object according to an exemplary embodiment.

The device 1 shown in FIG. 1 is configured to carry out a method for additive manufacturing of a three-dimensional object 2, wherein the method includes the following method steps, cf. FIG. 2. In a first method step 101, solidification or curing of a construction material 3 comprising at least one UV-curable component is achieved by means of UV radiation 4 to form a green body 5 by successive, in particular layer-by-layer, selective exposure. This green body 5 solidified or cured at least by means of UV radiation 4 in the first solidification step 101 is subjected to thermal energy in a following solidification step 102, wherein at least one component of the construction material 3 thermally cures upon exceeding of a curing temperature and in this way a three-dimensional object 2 present in its physical and/or chemical target properties, in particular in its mechanical component target properties, is manufactured.

A control of the UV radiation 4 taking place via the control device 7, and thus of the exposure (in the first solidification step 101) to form the green body 5 can be executed in such a way that the curing temperature of the at least one component of the construction material 3 is not significantly exceeded or is not exceeded at least in sections, preferably predominantly, particularly preferably completely.

The successive, in particular layer-by-layer, selective exposure and solidification of the construction material 3 comprising at least one UV-curable component by means of UV radiation 4 to form the green body 5 can take place in a construction chamber, wherein a detection device 8 for detecting parameter data and/or a temperature value is provided in/or on the construction chamber and the control of the exposure taking place by means of the UV radiation to form the green body 5 takes place as a function of the parameter data and/or as a function of the temperature value. The parameter data can comprise, for example, process parameter data of the control of the additive manufacturing method.

The control of the exposure taking place by means of the UV radiation 4 to form the green body 5 can take place, for example, as a function of parameter data and/or temperature values obtained from preceding additive manufacturing methods for manufacturing at least one three-dimensional object 2 and/or as a function of parameter data and/or temperature values derived in the course of a simulation in consideration of a target geometry of the three-dimensional object 2 to be manufactured. The target geometry of the three-dimensional object 2 is to be understood as its desired geometry.

To ascertain data obtained from preceding additive manufacturing methods, for example, at least one three-dimensional object 2 manufactured from the preceding manufacturing method can be subjected to a strength and/or rigidity analysis. It can be expedient here if the data are ascertained or derived proceeding from strength and/or rigidity values of the previously manufactured three-dimensional object 2 ascertained from the strength and/or rigidity analysis.

The control of the exposure by means of the UV radiation 4 to form the green body 5 can be controlled in such a way that the average temperature in the construction material forming the green body 5 is at most 55° C., preferably at most 45° C., particularly preferably at most 37.5° C., most preferably at most 25° C.

The control of the exposure by means of the UV radiation 4 to form the green body 5 can comprise, for example, at least one of the following process parameters: (a) a change of a waiting time of a first UV introduction to a second UV introduction of the UV radiation 4 within one or different construction material layers and/or (b) a change of an intensity of a UV introduction of the UV radiation 4 into the construction material 3 within a construction material layer and/or (c) a change of a duration of an exposure time of a UV energy introduction of the UV radiation 4 within a construction material layer and/or a change of a wavelength of a UV energy introduction of the UV radiation 4 within one or more construction material layer(s).

The control of the UV radiation 4 to form the green body 5 can take place, for example, as a function of at least one item of target geometry information of the three-dimensional object 2 to be manufactured and/or as a function of an item of setpoint geometry information of the green body 5. In other words, depending on the target geometry information of the three-dimensional object 2 to be manufactured and/or depending on the setpoint geometry information of the green body 5, the UV radiation 4 is changed by a control device in such a way that a curing temperature of the material forming the green body 5 is not significantly exceeded or is not exceeded.

The device 1 can include a detection device 8, which is configured to detect parameter data and/or temperature values during the execution of the first solidification step 101 or during the creation of the green body 5 by means of the UV radiation 4. The detection device 8 can thermally detect a construction area and/or the already created green body 5 and/or the non-solidified construction material 3. For example, the detection device 8 can be designed, for example, as a thermal camera and/or as a probe touching the construction material 3. Alternatively or additionally, parameter data and/or temperature values of the manufacturing method can be obtained by evaluating preceding additive manufacturing methods. Optionally or additionally, parameter data and/or temperature values derived in the course of a simulation in consideration of the target geometry of the three-dimensional object 2 to be manufactured can be obtained. The parameter data and/or temperature values originating from the different sources can be evaluated and/or processed using a computing device 9 employing at least one artificial intelligence (AI) technology. By way of this evaluation and/or processing or influencing of the parameter data and/or temperature values, these can be used as a suitable influencing variable of the control of the exposure of the green body 5 carried out by means of the UV radiation 4.

It can be advantageous in this case, for example, if the computing device 9 executes an algorithm and/or a neural network on the basis of the parameter data and/or the temperature values and the computing device information resulting therefrom is used to influence the control of the exposure of the green body 5 carried out by means of the UV radiation 4. Because a large number of ascertained parameter data and/or temperature data are evaluated and/or weighted or combined by an algorithm or by a neural network, a precise control of the exposure of the green body 5 carried out by means of the UV radiation 4 can take place in such a way that an excessively high thermal energy introduction of the UV radiation into the construction material 3 is prevented.

The construction material 3 can comprise, for example, a resin and/or plastic including at least two components, wherein a first component cures predominantly, in particular exclusively, by means of UV radiation 4 and a second component cures or solidifies predominantly, in particular exclusively, by means of acting thermal energy.

During the formation of the green body 5 by means of the exposure of the construction material 3 comprising UV radiation 4, for example, at least one structural means 10 connected to the at least one green body 5 can also be constructed, wherein the structural means 10 experiences a thermal energy introduction, which is higher due to the action of the UV radiation 4 in a defined or targeted manner, at least in sections, in particular completely, than the green body 5. The introduction of thermal energy by means of the UV radiation 4 into the construction material 3 can be different in this case by at least 10%, preferably by at least 20%, particularly preferably by at least 35%, most preferably by at least 50%, or can be increased in the structural means 10.

The structural means 10 can connect, for example, at least one green body 5 to a construction plate 11 and/or a first green body 5 to a further green body 5. It can be expedient in this case if the at least one structural means 10 is designed as a support means and/or handling means. For example, the structural means 10 is provided with a predetermined breaking point, wherein the structural means 10 can be separated from the green body 5 and/or from the three-dimensional object 2 and/or from the construction plate 11 via the predetermined breaking point. Due to the later separation of the structural means 10, it can be conceived in such a way that it does not form a part of the target geometry of the three-dimensional object 2.

At least one structural means 10 can include, for example, at least one first section 13 and one second section 14, wherein the first section 13 experiences a higher thermal energy introduction during the exposure by means of the UV radiation 4 than the second section 14. For example, the first section 13 and/or the second section 14 of the structural means 10 experiences a higher energy introduction during the exposure by means of the UV radiation 4 than the construction material forming the green body 5. The difference of the thermal energy introduction between the two sections 13, 14 and/or between at least one section 13, 14 and the green body 5 can be, for example, in the order of magnitude of the factor of 1.3, preferably 1.5, particularly preferably 2.0, most preferably 4.0.

The structural means 10 can include, for example, at least one stability section 15 and at least one shielding section 16, wherein the stability section 15 experiences a higher thermal energy introduction during the exposure by means of the UV radiation 4 than the shielding section 16, wherein the shielding section 16 is formed as an area externally enclosing the stability section 15 at least in sections, in particular completely. It is apparent from FIG. 1 that the stability section 15 is separated or spaced apart by the shielding section 16 from the non-solidified construction material 3, therefore an increased energy introduction taking place in the stability section 15 cannot directly reach the non-solidified construction material 3 (cf. the area indicated by the arrow 6), since the shielding section 16 possesses or executes a buffer function for a heat transfer from the stability section 15 to the non-solidified construction material 3. The aging of the non-solidified construction material 3 can thus be reduced or its reusability can be increased.

The invention described herein furthermore comprises a three-dimensional object 2, in particular a vehicle part, which was manufactured in a manner produced in a method described herein. The three-dimensional object 2 or the vehicle part can be used in a vehicle (not shown), in particular in a motor vehicle.

An additive manufacturing device or a device 1 for executing the method described herein is shown by way of example in FIG. 1, which forms a three-dimensional object 2 by means of a CLIP method. In addition to the CLIP method, the method described herein can also be applied to other additive construction methods which use a liquid or powdered construction material 2. The CLIP method can provide that in the first solidification step 101, cf. FIG. 1, in particular in a polymerization step, a construction material 3 which can be UV-solidified or is UV-solidifying under the action of UV radiation 4, in particular a UV-curable component of the construction material 3, is successively solidified, preferably layer-by-layer, selectively by means of UV radiation 4 emitted from a radiation device 17, in order to form a green body 5.

The device 1 shown can comprise a construction container 18. The base 19 of the container 4 is permeable to light and gas, or is provided with a light-permeable and gas-permeable body 20—also designated as a "permeable window"—so that the UV radiation 4 can penetrate the base 19 of the construction container 18 and strike an intermediate area 21—also designated as a "dead zone"—or reach the intermediate area 21 and solidify the construction material 3 located therein depending on the area. The light-permeable and gas-permeable body 20 enables the passage of UV radiation 4 and a gas medium (not shown). The UV radiation 4 reaches the construction material 3 and at least partially cures it, the gas medium reaches the construction material 3 and prevents an adhesion of the construction material 3 to the base 19 of the construction container 18 and thus contributes to the functionality of the intermediate area 21. The UV radiation 4 exits from the radiation device 17 and is deflected by a mirror device including at least two mirror elements 22 in such a way that the UV radiation 4 is incident in the intermediate area 21 selectively depending on area, for example also flatly at least in sections, wherein the intensity and/or exposure time of the UV radiation 4 within the incidence surface in the intermediate area 21 can be different or is deliberately controllable. A solidified or partially solidified green body 5 can thus be formed in the intermediate area 21, in particular having different material properties depending on area (depending on for example the intensity of the UV radiation 4).

The intensity and/or exposure time of the UV radiation 4 is set or changed, for example (a) by a control of the moving mirror elements 22, in particular in frequency, of a minor device and/or (b) by the radiation device 17. At least one UV-LED light source can be used as the radiation device 17, for example. The minor device can be designed, for example, as a micromirror array.

The construction material 3 can include photoinitiators, for example, which trigger a radical polymerization due to the energetic effect of the UV radiation 4, in which monomers grow to form polymers by chain scission of the double bond. Here, the construction material 3 can cure along the UV-exposed surface. A connection to the vertically displaceable (cf. arrow 12) construction platform or construction plate 11 results here, which moves successively or continuously due to action of an actuator (not shown) upward by a layer height or a layer thickness (thus away from the radiation device 17), in order to form a space for construction material 3 which is flowing in and is to be solidified depending on area. In the CLIP method, in general the intermediate area 21 or the area of the three-dimensional object 2 facing toward the UV radiation 4 and the base 19 of the construction container 18 always remain covered with liquid construction material 3 during the construction process (with the exception of the running in of the liquid construction material 3 filling a free space below the raised construction plate 11 or below the raised three-dimensional object 2), which can in turn be solidified by the UV radiation 4. A green body 5 constructed in layers or layer-by-layer successively results by multiple repetition of this process. After the desired shape of the green body 5 has been created by this method, the three-dimensional object 2 is, for example, moved entirely out of the bath of the liquid and non-solidified construction material 3 or out of the construction container 18 filled with liquid construction material 3 and finally separated or detached from the construction plate 11.

Before or after the separation of the green body 5 from the construction plate 11 (for example the construction plate 11 can be separated from the device 1 and brought to a further processing station), it is subjected to thermal energy in the course of a second solidification step 102. This targeted, preferably full-surface, heating of the green body 5 results in further curing or interlinking of the construction material and thus in the final physical and/or chemical properties, in particular final component properties, of the three-dimensional object 2. Due to the thermal application or due to the elevated temperatures in the course of the second or thermal solidification step 102, for example, a displacement reaction, also called a chain-lengthening reaction, of a chain lengthener (component B) with oligomers (component A) can be initiated in the construction material 3 forming the green body 5. The chain lengthener and the oligomers can form a component of the construction material 3 here.

LIST OF REFERENCE CHARACTERS 1 device
2 three-dimensional object
3 construction material
4 UV radiation
5 green body
6 area of non-solidified construction material
7 control device
8 detection device
9 computing device
10 structural means
11 construction plate
12 arrow
13 first section of 10
14 second section of 10
15 stability section of 10
16 shielding section of 10
17 radiation device
18 construction container
19 base of 18
20 body of 19
21 intermediate area
22 minor element
101 first solidification step
102 second solidification step

The invention claimed is:

1. A method for additive manufacturing of a three-dimensional object, comprising the steps of:
  successively exposing a construction material comprising at least one UV-curable component by UV radiation to form a green body; and
  subjecting the green body to thermal energy, wherein at least one component of the construction material thermally cures to form the three-dimensional object upon exceeding of a curing temperature;
  wherein the successively exposing by the UV radiation to form the green body is controlled such that at least in sections the curing temperature of the at least one component is not significantly exceeded, wherein, during the successively exposing, a structural member connected to the green body is constructed and wherein the structural member experiences at least in sections a thermal energy introduction which is higher, due to an effect of the UV radiation in a defined manner, than the green body, wherein the structural member includes a stability section and a shielding section, wherein the stability section experiences a higher thermal energy introduction during the successively exposing than the shielding section, and wherein the shielding section is formed as an area externally enclosing the stability section at least in sections.

2. The method according to claim 1, wherein the successively exposing takes place in a construction chamber, wherein a detection device is disposed in or on the construction chamber, wherein parameter data and/or a temperature value is detected by the detection device, and wherein the successively exposing is controlled as a function of the parameter data and/or as a function of the temperature value.

3. The method according to claim 1, wherein the successively exposing is controlled as a function of parameter data and/or temperature values obtained from a preceding additive manufacturing method to manufacture a three-dimensional object and/or as a function of parameter data and/or temperature values derived in a course of a simulation in consideration of a target geometry of a three-dimensional object to be manufactured.

4. The method according to claim 3, wherein the parameter data of the preceding additive manufacturing method is ascertained from a strength and/or a rigidity analysis of the three-dimensional object manufactured from the preceding additive manufacturing method.

5. The method according to claim 1, wherein the successively exposing is controlled such that an average temperature in the construction material forming the green body is at most 55° C.

6. The method according to claim 1, wherein the successively exposing is controlled using process parameters of:
  a change of a waiting time of a first UV entry to a second UV entry of the UV radiation within one or different construction material layers; and/or
  a change of an intensity of a UV introduction of the UV radiation into the construction material within a construction material layer; and/or
  a change of a duration of an exposure time of a UV energy introduction of the UV radiation within a construction material layer; and/or
  a change of a wavelength of a UV energy introduction of the UV radiation within one or more construction material layers.

7. The method according to claim 1, wherein the successively exposing is controlled as a function of at least one item of target geometry information of the three-dimensional object to be manufactured and/or as a function of an item of setpoint geometry information of the green body.

8. The method according to claim 1, wherein parameter data and/or temperature values detected by a detection device and/or obtained from a previous additive manufacturing method and/or derived in a course of a simulation in consideration of a target geometry of the three-dimensional object to be manufactured, are evaluated and/or processed using a computing device using artificial intelligence technologies and are used to influence the control of the successively exposing.

9. The method according to claim 8, wherein the computing device executes an algorithm and/or a neural network on a basis of the parameter data and/or the temperature values to produce computing device information and wherein the computing device information is used to influence the control of the successively exposing.

10. The method according to claim 1, wherein the construction material comprises a resin and/or an artificial resin including at least a first component and a second component and wherein the first component cures exclusively by UV radiation and the second component cures exclusively by thermal energy.

11. The method according to claim 1, wherein the structural member connects the green body to a construction plate and/or connects the green body to a further green body, wherein the structural member is support member and/or a handling member, wherein the structural member has a predetermined breaking point, and wherein the structural member is separated from the green body and/or the construction plate via the predetermined breaking point.

12. The method according to claim 1, wherein the structural member includes a first section and a second section, wherein the first section experiences a higher thermal energy introduction during the successively exposing than the second section, and wherein the first section and/or the second section experiences a higher energy introduction during the successively exposing than the green body.

13. A three-dimensional object manufactured by the method according to claim 1.

14. The three-dimensional object according to claim 13, wherein the three-dimensional object is a vehicle component.

* * * * *